United States Patent [19]

Bottomley

[11] Patent Number: 5,499,272

[45] Date of Patent: Mar. 12, 1996

[54] DIVERSITY RECEIVER FOR SIGNALS WITH MULTIPATH TIME DISPERSION

[75] Inventor: Gregory E. Bottomley, Cary, N.C.

[73] Assignee: Ericsson GE Mobile Communications Inc., Research Triangle Park, N.C.

[21] Appl. No.: 251,202

[22] Filed: May 31, 1994

[51] Int. Cl.⁶ .............................. H03H 7/30; H04B 7/10
[52] U.S. Cl. ........................................... 375/347; 375/340
[58] Field of Search .............................. 375/100, 14, 97; 371/43, 46

[56] References Cited

U.S. PATENT DOCUMENTS

| | | | |
|---|---|---|---|
| 5,031,193 | 7/1991 | Atkinson et al. | 375/13 |
| 5,048,059 | 9/1991 | Dent | 375/340 |
| 5,191,598 | 3/1993 | Bäckström et al. | 375/100 |
| 5,263,053 | 11/1993 | Wan et al. . | |
| 5,285,480 | 2/1994 | Chennakeshu et al. | 375/348 |
| 5,313,495 | 5/1994 | Kim . | |

FOREIGN PATENT DOCUMENTS

| | | |
|---|---|---|
| WO90/16118 | 12/1990 | WIPO. |
| 449327 | 10/1991 | European Pat. Off. |
| 0508407A2 | 10/1992 | European Pat. Off. . |
| 0508407A3 | 10/1992 | European Pat. Off. . |
| 0544315A2 | 6/1993 | European Pat. Off. . |
| 0550143A2 | 7/1993 | European Pat. Off. . |

OTHER PUBLICATIONS

S. Chennakesu et al, "Differential Detection of π/4–Shifted–DQPSK for Digital Cellular Radio", *IEEE*, 1991, pp. 186–191.
A. P. Clark et al, "Adaptive Channel Estimator for an HF Radio Link", *IEEE Trans. on Commun.*, vol. 37, No. 9, Sep. 1989, pp. 918–926.
M. V. Eyuboğlu et al, "Reduced–State Sequence Estimation with Set Partitioning and Decision Feedback", *IEEE Trans. on Commun.*, vol. 36, No. 1, Jan. 1988, pp. 13–20.
W. C. Y. Lee, *Mobile Communications Engineering*, McGraw–Hill Book Co., 1982, pp. 291–336.

Q. Liu et al., "An Adaptive Maximum–likelihood Sequence Estimation Receiver with Dual Diversity Combining/Selection", *IEEE*, 1992, pp. 245–249.

Q. Liu et al., "A Unified MLSE Detection Technique for TDMA Digital Cellular Radio", *IEE*, 1993, pp. 265–268.

J. G. Proakis, *Digital Communications*, McGraw–Hill Book Company, 1989, pp. 554–643.

W. H. Sheen et al., "MLSE Equalization and Decoding for Multipath–Fading Channels", *IEEE Trans. on Commun.*, vol. 39, No. 10, Oct. 1991, pp. 1455–1464.

G. Ungerboeck, "Adaptive Maximum–Likelihood Receiver for Carrier–Modulated Data–Transmission Systems", *IEEE Trans. on Commun.*, vol. COM–22, No. 5, May 1974, pp. 624–636.

Abrardo et al., "New Diversity Receiver for Mobile Communications,"*Electronics Letters*, vol. 29, No. 25, December, 1993, pp. 2168-2169.

*Primary Examiner*—Stephen Chin
*Assistant Examiner*—Huong Luu
*Attorney, Agent, or Firm*—Burns, Doane, Swecker & Mathis

[57] ABSTRACT

A digital communications receiver provides joint MLSE equalization and diversity combining. A plurality of diversity branches are processed to produce complex receive data samples and synchronization information. Channel estimators then form channel estimates from the data samples and synchronization information. The data samples and channel estimates are then used by pre-processors to produce metric multipliers. Finally, the metric multipliers are combined with hypothesized data sequences to generate and accumulate metrics using a sequence estimation algorithm to produce a demodulated data stream.

14 Claims, 4 Drawing Sheets

DIVERSITY RECEIVER FOR SIGNALS WITH MULTIPATH TIME DISPERSION

FIELD OF THE DISCLOSURE

The present invention relates to diversity combining and equalization in a receiver for digital wireless communications.

BACKGROUND OF THE DISCLOSURE

In recent years, digital wireless communication systems have been used to convey a variety of information between multiple locations. With digital communications, information is translated into a digital or binary form, referred to as bits, for communications purposes. The transmitter maps this bit stream into a modulated symbol stream, which is detected at the digital receiver and mapped back into bits and information.

In digital wireless communications, the radio environment presents many difficulties that impede successful communications. One difficulty is that the signal level can fade, because the signal may travel in multiple paths. As a result, signal images arrive at the receiver antenna out of phase. This type of fading is commonly referred to as Rayleigh fading or fast fading. When the signal fades, the signal-to-noise ratio becomes lower, causing a degradation in the communication link quality.

A second problem occurs when the multiple signal paths are much different in length. In this ease, time dispersion occurs, in which multiple fading signal images arrive at the receiver antenna at different times, giving rise to signal echoes. This causes intersymbol interference (ISI), where the echoes of one symbol interfere with subsequent symbols.

Raleigh fading can be mitigated by using diversity, such as antenna diversity, at the receiver. The signal is received on a plurality of antennas. Because the antennas have slightly different locations and/or antenna patterns, the fading levels on the antennas are different. In the receiver, these multiple antenna signals are combined either before or after signal detection using such techniques as maximal-radio-combining, equal-gain-combining, and selective combining. These techniques are well known to those skilled in the art and can be found in standard textbooks, such as W.C.Y. Lee, *Mobile Communications Engineering*, New York: McGrawHill, 1982.

The time dispersion can be mitigated by using an equalizer. Common forms of equalization are provided by linear equalizers, decision-feedback equalizers, and maximum-likelihood sequence-estimation (MLSE) equalizers. A linear equalizer tries to undo the effects of the channel by filtering the received signal. A decision-feedback equalizer exploits previous symbol detections to cancel out the intersymbol interference from echoes of these previous symbols. Finally, an MLSE equalizer hypothesizes various transmitted symbol sequences and, with a model of the dispersive channel, determines which hypothesis best fits the received dam. These equalization techniques are well known to those skilled in the art, and can be found in standard textbooks such as J.G. Proakis, *Digital Communications*, 2nd ed., New York: McGraw-Hill, 1989.

Of the three common equalization techniques, MLSE equalization is preferable from a performance point of view. In the MLSE equalizer, all possible transmitted symbol sequences are considered. For each hypothetical sequence, the received signal samples are predicted using a model of the multipath channel. The difference between the predicted received signal samples and the actual received signal samples, referred to as the prediction error, gives an indication of how good a particular hypothesis is. The squared magnitude of the prediction error is used as a metric to evaluate a particular hypothesis. This metric is accumulated for different hypotheses for use in determining which hypotheses are better. This process is efficiently realized using the Viterbi algorithm, which is a form of dynamic programming.

Ideally, the diversity combining process and the equalization process should be combined in some optimal way. Recent research has shown that for MLSE equalization, diversity combining should be done within the equalizer. This research can be found in W.H. Sheen and G.L. Stüber, "MLSE equalization and decoding for multipath-fading channels," IEEE *Trans. Commun.*, vol. 39, pp. 1455–1464, Oct. 1991; Q. Liu and Y. Wan "An adaptive maximum-likelihood sequence estimation receiver with dual diversity combining/selection," *Ind. Symp. on Personal, Indoor and Mobile Radio Commun.*, Boston, Mass., pp. 245–249, Oct. 19–21, 1992; and Q. Liu and Y. Wan, "A unified MLSE detection technique for TDMA digital cellular radio," 43rd IEEE *Vehicular Technology Conference*, Seacaucus, N.J., pp. 265–268, May 18–20, 1993. In the above mentioned research, diversity combining is performed by adding together the magnitude squared prediction errors from different diversity channels when forming metrics.

Further improvement is obtained by scaling the squared prediction errors from the different diversity branches. A detailed description of such an MLSE equalizer is given in U.S. Pat. No. 5,191,598 to T.O Bäckstrom et al., which is incorporated herein by reference. Unfortunately, the MLSE equalizer involves computing many squared prediction error terms. This can be costly in terms of hardware or software complexity. Thus, there is a need to reduce the complexity of the MLSE equalizer/diversity combiner.

For the MLSE equalizer without diversity combining, the Ungerboeck method applies two steps to reduce complexity, as described in G. Ungerboeck, "Adaptive maximum likelihood receiver for carrier modulated data transmission systems," IEEE *Trans. Commun.*, vol. COM-22, no. 4, pp. 624–535, May 1974. The first step is to expand the magnitude square term and to eliminate terms that are common to all hypotheses. As a simple example, the term $(a-b)^2$ can be expanded into $a^2-2ab+b^2$. If "a" does not depend on the hypothesized data, then the $a^2$ term can be dropped from the metric computation.

The second step used by Ungerboeck is to re-arrange the order of the metric computations. With standard MLSE equalization, metrics are computed and updated based on successively received data samples. Each iteration of the Viterbi algorithm corresponds to a new received data sample. Using the second step, each iteration of the Viterbi algorithm corresponds to a newly transmitted symbol.

These two steps can be further explained by a simple example. Suppose the transmitter transmits a symbol stream $s(n)$, in which each $s(n)$ can take on one of S possible complex values. At the receiver, the received signal is sampled once every T seconds, where T is the symbol period, to give a received signal stream $r(n)$. Suppose the intervening channel consists of two fading rays, a main ray and an echo, where the echo arrives T seconds later. Then, the received signal can be modeled as:

$$r(n)=c(0)s(n)+c(1)s(n-1)+n(n)$$

where $c(0)$ and $c(1)$ are complex channel tap values and $n(n)$ is additive noise of some kind.

In the MLSE equalizer, at iteration n, there would be S different previous "states", corresponding to the S possible values for $s(n-1)$. Associated with each previous state would be an accumulated metric, accumulated from previous iterations. There would also be S current states, corresponding to the S possible values for s(n). Each possible pairing of a previous state with a current state corresponding to a hypothetical sequence $\{s_h(n), s_h(n-1)\}$. For each hypothesis, the predicted received signal value would be:

$$r_{pred}(n,h)=c(0)\ s_h(n)+c(1)s_h(n-1)$$

The corresponding branch or delta metric would be given by $$M_h(n)=|r(n)-r_{pred}(n,h)|^2$$

The candidate metric for a current state would be the sum of the branch metric and the previously accumulated metric associated with $s_h(n-1)$. For each current state, there are S possible previous states. For each current state, the previous state which gives the smallest candidate metric is selected as the predecessor state, and the candidate metric becomes the accumulated metric for that current state.

At the next iteration, using r(n+1), the current states from time n become the previous states at time n+1. After all the data have been received, the state with the smallest accumulated metric, and all the predecessors, indicate the most likely transmitted symbol sequence, which becomes the detected symbol sequence. Sometimes decisions are made before all the data are received using a decision depth.

The first Ungerboeck step can be illustrated by expanding the expression for $M_h(n)$. This gives $$M_h(n)=A(n)+B(n)+C(n)+D(n)$$

where $$A(n)=|r(n)|^2$$

$$B(n)=2Re\{\ r(n)\ c^*(0)s_h^*(n)\}+2Re\{\ r(n)c^*(1)s_h^*(n-1)\}$$

$$C(n)=|c(0)|^2|\ s_h(n)|^2+|c(1)|^2|s_h(n-1)|^2$$

$$D(n)=2Re\{c(0)c^*(1)s_h(n)s_h^*(n-1))\}$$

where "*" denotes complex conjugation. The Ungerboeck method drops the term A(n), which is common to all $M_h(n)$.

The second Ungerboeck step combines terms proportional to $s_h^*(n)$ from different iterations. At iteration n+1, the terms become:

$$B(n+1)=2Re\{r(n+1)\ c^*(0)s_h^*(n+1)\}+\ 2Re\{r(n+1)c^*(1)s_h^*(n)\}$$

$$C(n+1)=|c(0)|^2|s_h(n+1)|^2+|c(1)|^2|s_h(n)|^2$$

$$D(n+1)=2Re\{c(0)c^*(1)s_h(n+1)s_h^*(n)\}$$

Thus, there are terms proportional to $s_h^*(n)$ in both iterations. These can be recombined by defining a new metric, $M'_h(n)$, as $$M'_h(n)=B'(n)+C'(n)+D(n)$$

where $$B'(n)=2Re\{\ f(n)s_h^*(n)\}$$

$$f(n)=r(n)c^*(0)+r(n+1)c^*(1)$$

$$c'(n)=(|c(0)|^2+\ |c(1)|^2)|s_h(n)|^2$$

As a result, B'(n) contains f(n), which can be realized by filtering the received data r(n) with a filter using taps c*(0) and c*(1).

Thus, the new metric uses two data samples, r(n) and r(n+1), instead of just one, r(n). Also, unlike B(n) and C(n), B'(n) and C'(n) depend only on one hypothesized symbol, $s_h(n)$, instead of two, $s_h(n)$ and $s_h(n-1)$. Thus, conceptually, iteration n corresponds to the transmitted symbol $s_h(n)$ rather than the received data value r(n).

When MLSE equalization and diversity combining are performed together, the Ungerboeck form can be used to reduce the complexity. The situation where c(0) and c(1) do not change with time, referred to as the static channel case, was described in U.S. Pat. No. 5,031,193 to Atkinson et al. In the Atkinson et al. patent, both Ungerboeck steps are used to obtain the demodulator shown in FIGS. 1 and 2 of U.S. Pat. No. 5,031,193. In FIG. 2 of the Atkinson et al. patent, the term f(n) is realized with a matched filter on the diversity branch 1, and a matched filter on the diversity branch 2.

However, there are disadvantages with using the Ungerboeck form. One is the problem that the channel tap values, c(0) and c(1) in the above example, may change with sample time n. In the conventional form, all of the c(0) and c(1) terms can be replaced with c(0,n) and c(1,n). As a result, the Ungerboeck form contains a mixture of channel taps from time n and from time n+1. This would require storage capability for multiple sets of channel taps and may make channel tracking more difficult. Channel tracking and prediction are well understood and examples can be found in A.P. Clark and S. Hariharan, "Adaptive channel estimator for an HF radio link." IEEE *Trans. Commun.*, vol. 37, pp. 918–926, Sept. 1989.

In U.S. Pat. No. 5,031,193, an alternative solution is given to address the case of time-varying channel taps. However, this solution does not use the Ungerboeck form, and it does not combine equalization and diversity combining in an optimal manner. Instead, each diversity branch has a separate equalizer. Channel tracking is performed using branch detections, not detections which have benefitted from diversity combining. The outputs of these equalizers are then combined using standard diversity combining techniques. So, the equalization and diversity combining steps have been performed separately, not jointly.

Thus, there is a need for a receiver that jointly performs MLSE equalization and diversity combining and that lends itself to the case where the channel varies as a function of time.

SUMMARY OF THE DISCLOSURE

An object of the present invention is to provide an efficient form of joint MLSE equalization and diversity combining for use in a wireless digital communications receiver. This is achieved by expanding the metric expressions and collecting terms that correspond to the same hypothesized transmitted symbol. Embodiments of the present invention will be given for both the static and time-varying channel cases.

One embodiment of the present invention discloses a digital communications receiver comprising means for signal processing a plurality of diversity branches to produce complex receive data samples and synchronization information. Channel estimate means then form channel estimates from the data samples and synchronization information. The data samples and the channel estimates are then used by pre-processing means to produce metric multipliers. Finally, combining means combine the metric multipliers with hypothesized data sequences to generate and accumulate metrics using a sequence estimation algorithm to produce a demodulated data stream.

According to another embodiment of the present invention, a digital communication receiver is disclosed which comprises means for signal processing a plurality of diversity branches to produce complex receive data samples and synchronization information. Channel estimate means then form channel estimates using synchronization information and initial data detection to produce time-varying channel estimates. The data samples and the channel estimates are then used by pre-processing means to produce metric multipliers. Finally, combining means combine the metric multipliers with hypothesized data sequences to generate and accumulate metrics using a sequence estimation algorithm to produce a demodulated data stream.

BRIEF DESCRIPTION OF THE DRAWINGS

These and other features and advantages of the invention will be readily apparent to one of ordinary skill in the art from the following written description, used in conjunction with the drawings, in which.

DETAILED DESCRIPTION OF THE DISCLOSURE

In the present invention, MLSE equalization and diversity combining are performed jointly in a diversity equalizer. In this embodiment, the term s(nT) is a sequence of transmitted symbols, where the symbol period is T seconds. Pulse shaping is used to generate a continuous time signal, t(t). In addition, the term $r_d(t)$ is the baseband, complex received signal from diversity branch d. After synchronization, sampled received values are processed, where there are M samples per symbol period T. This allows for both symbol-based equalization (M=1) and fractionally-spaced equalization (M>1).

Thus, in the time period (nT,(n+1)T), samples $r_d(nT)$, $r_d((n+1/M)T)$ ... $r_d((n+(M-1)/M)T)$ are received on each diversity branch, one sample for each sampling phase. The following channel models are used for these received signals:

$$r_d((n+m/M)T) = c_{d,m}(0,n)s(nT) + c_{d,m}(1,n)s((n-1)T) + \ldots + c_{d,m}(J-1,n)s((n-J+1)T) \text{ for } m=0,1 \ldots M-1$$

where J is the number of channel taps in each model and $c_{d,m}(j,n)$ is the j'th channel tap for diversity branch d, sampling phase m, at time interval n.

The following delta metric is used in the Viterbi algorithm at iteration n:

$$M_h(n) = \sum_{d=0}^{D-1} \sum_{m=0}^{M-1} |r_d((n+m/M)T) - r_{d,pred}((n+m/M)T,h)|^2$$

where $$r_{d,pred}((n+m/M)T,h) = \sum_{j=0}^{J-1} c_{d,m}(j,n)s_h(j)$$

and $s_h(j)$ denotes a hypothesized symbol s(jT). This metric requires a significant amount of computation.

In some applications, it may be advantageous to employ a weighted sum when forming the metrics. This leads to the new form $$M_h(n) = \sum_{d=0}^{D-1} \sum_{m=0}^{M-1} w_{d,m}(n)|r_d((n+m/M)T) - r_{d,pred}((n+m/M)T,h)|^2$$

where $w_{d,m}(n)$ are noncomplex weighting factors.

For optimal-combining, these weights would be estimates of the reciprocals of the noise powers on link d at sampling phase m, i.e., $w_{d,m}(n) = 1/N_{d,m}(n)$. The noise powers can be kept constant over all or some iterations, or they can vary with each iteration n. The noise powers could be obtained from initial channel tap estimates and the synchronization data, since noise samples can be obtained by taking the difference between the received signal samples and the predicted signal samples, based on the known synchronization sequence. These noise samples can be magnitude squared and averaged to get an estimate of $N_{d,m}(n)$. It may be desirable to combine the estimates from different sampling phases, m, to obtain weights $W_d = 1/N_d$, which are independent of time and sampling phase. If the channel is time-varying, then signals internal to each channel tracker can be used to estimate the time-varying noise power. Alternatively, this may be done using detected symbols, the channel tap estimates, and the received data. The results from multiple sampling phases may be combined, thus giving $w_d(n) = 1/Nd(n)$.

For semi-optimal-combining, these weights would all be unity and could be ignored in the implementation. For selection combining, these weights would all be zero, except for the diversity channels(s) and sampling phase(s) selected. Selection could be based on a number of criteria, such as an estimate of the signal-to-noise ratio on each branch, and possibly the sampling phase, as well as an estimate of the signal or received power on each branch, and possibly the sampling phase. Other possibilities for these weights exist. These would in some way be related to diversity branch quality.

To reduce the complexity, the first Ungerboeck step is applied to each diversity branch and to each sampling phase. Terms common to all hypotheses are eliminated. This gives $$M_h(n) = B_h(n) + C_h(n) + D_h(n)$$

where $$B_h(n) = -2 \sum_{d=0}^{D-1} \sum_{m=0}^{M-1} w_{d,m}(n) \sum_{j=0}^{J-1} Re\{r_d((n+m/M)T)c_{d,m}^*(j,n)s_h^*(n-j)\}$$

$$C_h(n) = \sum_{d=0}^{D-1} \sum_{m=0}^{M-1} w_{d,m}(n) \sum_{j=0}^{J-1} |c_{d,m}(j,n)|^2 |s_h(n-j)|^2$$

$$D_h(n) = 2 \sum_{d=0}^{D-1} \sum_{m=0}^{M-1} w_{d,m}(n) \sum_{j=0}^{J-1} \sum_{\substack{k=0 \\ k \neq j}}^{K-1} Re\{c_{d,m}^*(j,n)c_{d,m}(k,n)s_h^*(n-j)s_h(n-k)\}$$

At this point, the second Ungerboeck step, collecting terms from different iterations, is not performed. Instead, according to the present invention, the order of summation is changed within the same iteration. This leads to the novel form:

$$B_h'(n) = -2 \sum_{j=0}^{J-1} \text{Re}\left\{ \left[ \sum_{d=0}^{D-1} \sum_{m=0}^{M-1} w_{d,m}(n) r_d((n+m/M)T) c_{d,m}^*(j,n) \right] s_h^*(n-j) \right\}$$

$$C_h'(n) = \sum_{j=0}^{J-1} \left[ \sum_{d=0}^{D-1} \sum_{m=0}^{M-1} w_{d,m}(n) |c_{d,m}(j,n)|^2 \right] |s_h(n-j)|^2$$

$$D_h'(n) = 2 \sum_{\substack{j=0 \\ k>j}}^{J-1} \sum_{k=0}^{J-1} \text{Re}\left\{ \left[ \sum_{d=0}^{D-1} \sum_{m=0}^{M-1} w_{d,m}(n) c_{d,m}^*(j,n) c_{d,m}(k,n) \right] s_h^*(n-j) s_h(n-k) \right\}$$

The terms in the brackets [] do not depend on the hypothesized data. Thus, these terms can be computed in a metric pre-processor and used multiple times when computing the metrics in a metric processor.

In the term in the brackets [] in $B_h'(n)$, the inner summation over m gives rise to an M-tap FIR filter on the received data in diversity branch d. Since this summation is different for each value of j, i.e., different rays or channel taps, this implies a bank of FIR filters on each branch, one for each value of j. The filter data and coefficients would both be complex. For the case of T-spaced equalization, when M=1, each FIR filter would simply be a 1-tap filter, which is equivalent to a multiplier.

The output of each FIR filter does not have to be computed for every shift of the input data. In general, only one output is needed for every M shifts of the input data. This output corresponds to the case when the FIR data contents are the M values r(nT) through r((n+(M−1)/M)T). Thus, this can be equivalently realized by a register which, at time n, is loaded with these data values. Then, channel tap estimates for time n are used to multiply the register contents, the products being accumulated in an accumulator.

The outer summation over d implies combining the outputs of the FIR filter banks to one bank of combined outputs, each element corresponding to a different channel tap j. Also, for terms $C_h'(n)$ and $D_h'(n)$, the terms in the brackets [] only depend on the channel taps. If the channel taps do not change, or are only updated every so many iterations, then these terms in the brackets [] can be reused in multiple iterations.

These implementation considerations lead to the following form of the present invention. The delta metric is computed as $$M_h(n) = B_h'(n) + C_h'(n) + D_h'(n)$$

where $$B_h'(n) = -2 \sum_{j=0}^{J-1} \text{Re}\{e(j,n) s_h^*(n-j)\}$$

and $$C_h'(n) = \sum_{j=0}^{J-1} f(j,n) |s_h(n-j)|^2$$

$$D_h'(n) = 2 \sum_{\substack{j=0 \\ k>j}}^{J-1} \sum_{k=0}^{J-1} \text{Re}\{g(j,k,n) s_h^*(n-j) s_h(n-k)\}$$

$$e(j,n) = \sum_{d=0}^{D-1} \sum_{m=0}^{M-1} r_d((n+m/M)T) c_{d,m}^*(j,n) w_{d,m}(n)$$

$$f(j,n) = \sum_{d=0}^{D-1} \sum_{m=0}^{M-1} w_{d,m}(n) |c_{d,m}(j,n)|^2$$

$$g(j,k,n) = \sum_{d=0}^{D-1} \sum_{m=0}^{M-1} w_{d,m}(n) c_{d,m}^*(j,n) c_{d,m}(k,n) \quad k>j$$

The terms e(j,n), f(j,n) and g(j,k,n) can be pre-computed in a metric preprocessor. These are referred to as metric multipliers, since they are used in multiplications to form the equalizer metrics. Then, the metric processor would implement the Viterbi algorithm, taking advantage of the pre-computed quantities.

It should be noted that one may employ further techniques to trade-off memory and processing requirements when computing the metric multipliers. For example, one can define $x_{d,m}(n)$ as the square root of $w_{d,m}(n)$. Then, one could replace the $c_{d,m}(j,n)$ terms with $\tilde{c}_{d,m}(j,n) = x_{d,m}(n) c_{d,m}(j,n)$ and replace $r_d((n+m/M)T)$ with $\tilde{r}_d((n+m/M)T) = x_{d,m}(n) r_d((n+m/M)T)$. Alternatively, one could define $c'_{d,m}(j,n) = w_{d,m}(n) c_{d,m}(j,n)$ and use a mixture of primed and unprimed channel models. Also, the factors of 2 may be dropped from $B_h'(n)$ and $D_h'(n)$, and a factor of ½ included in $C_h'(n)$. Finally, all terms may be negated, giving a metric to be maximized.

It should also be noted that for certain modulation schemes, all transmitted symbols have the same amplitude, i.e., $|s_h(n)|$ is the same for all h and n. In this case, the terms $C_h'(n)$ and f(j,n) do not need to be computed. Also, in certain modulation schemes, the term $s_h(n-j) s_h^*(n-k)$ does not need to be computed J(J−1) times, since it typically takes on fewer possible values. One possibility is to store these values in a lookup table whose index is determined by the hypothetical symbol values. Finally, for certain modulations, the hypothesized symbol values are simple values, so that the multiplication operation is not necessary. For example, BPSK gives hypothesized symbol values of +1 and −1, so that multiplication can be replaced with a possible sign change. Similar properties hold for QPSK or QPSK-based modulations.

First, consider the case where it is assumed that the channel model is static, i.e., not time varying, for demodulating the data associated with a particular synchronization field. This can occur in a digital TDMA system which uses a short burst duration, as in the GSM system. This implies that $c_{d,m}(j,n) = c_{d,m}(j)$, e(j,n)=e(j), f(j,n)=f(j), and g(j,k,n)=g(j,k), independent of n. Thus, a single set of channel estimates is needed for each diversity branch and sampling phase. Also, if optimal-combining is used, the weights $w_{d,m}(n)$ become $w_{d,m}$.

Figure 1:
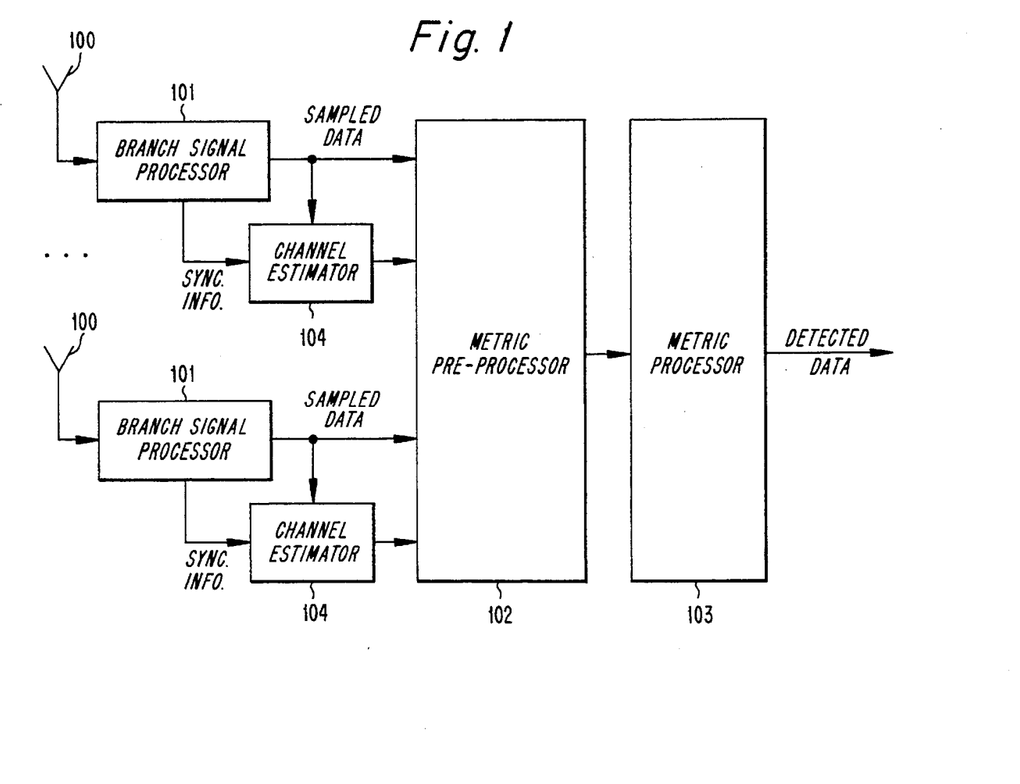
FIG. 1 illustrates a digital communication receiver according to one embodiment of the present invention.

The above described concepts are implemented into a receiver according to one embodiment of the present invention which is illustrated in FIG. 1. Radio signals are received by a plurality of antennas 100. Each antenna signal is processed by a branch signal processor 101, which produces baseband, complex data samples, as well as synchronization information. This information includes timing information and possibly initial channel tap estimates, which may be obtained from the correlations of the known synchronization sequence with the received data. The branch signal processor may also include a buffer for storing data samples.

A channel estimator 104 uses the synchronization information and the sampled data corresponding to the synchronization field to determine channel tap estimates. The channel estimator 104 can use a variety of methods to determine the channel tap estimates. One such method is described in U.S. Pat. No. 5,031,193, in which the synchronization correlation values are simply kept as the channel tap estimates. An alternative is to find channel tap estimates that, in a least squares sense, best predict the received data that corresponds to the synchronization field. Because these channel tap estimates may be noisy, it may be useful to further process these channel tap estimates.

The data samples and channel tap estimates are processed by a metric preprocessor 102, which essentially computes the metric multipliers e(j), g(j,k), and f(j), as required. These multipliers are supplied to a metric processor 103, which performs the Viterbi equalization process. This results in a detected symbol sequence which may be converted into an information bit stream. The data or bit stream may be in soft form or passed with soft information, which may be used in subsequent decoding. In making the conversion to data values, the metric processor 103 effectively demodulates the data, which may have been modulated using any form of modulation, such as BPSK, GMSK, QPSK, DBPSK, DQPSK, or π/4-shift DQPSK.

Because the channel is static, the terms f(j) and g(j,k) need only be computed once, or once per a predetermined demodulation interval. Also, in the metric processor 103, the $C'_h$ and $D'_h$ terms can be pre-computed for all possible hypotheses and stored in a table for use in each iteration. If $|s_h(n)|$ is the same for all hypotheses, as is the case in commonly used digital modulation schemes, then the terms f(j) and $C'_h$ need not be computed.

Figure 2:
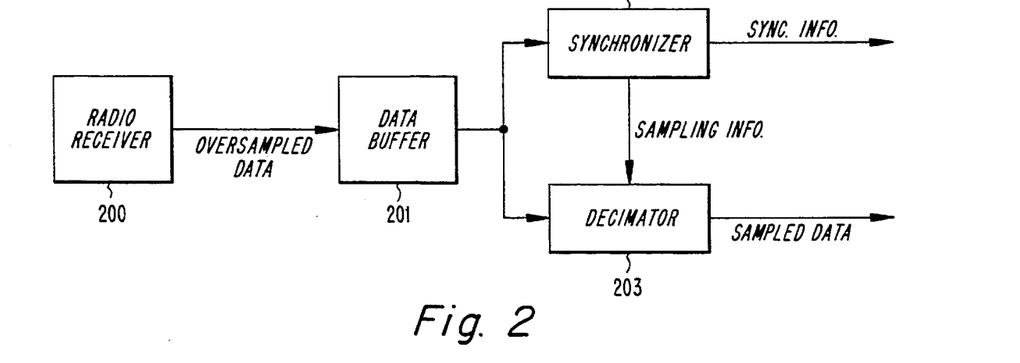
FIG. 2 illustrates a branch signal processor according to one embodiment of the present invention.

An embodiment of the branch signal processor, one per diversity branch, is described in more detail in FIG. 2. The radio receiver 200 converts the radio signal into a sampled, complex baseband received signal. There are many ways of performing this conversion, though most involve some form of filtering, mixing with local oscillator signals, and amplification. One well known approach is shown in FIG. 2 of U.S. Pat. No. 5,031,193. Another approach involves the use of log-polar quantization, later followed by conversion to complex samples, as shown in U.S. Pat. No. 5,048,059, which is incorporated herein by reference. The received signal samples are stored in a buffer 201. If the digital cellular system is TDM or TDMA, the buffer allows storage of at least one time slot of data. In an FDM or FDMA system, the buffer 201 may be omitted.

The synchronizer 202 determines which of the data samples to keep for further processing by selecting one or more sampling phases, where each sampling phase corresponds to keeping 1 sample every T seconds. For fractionally-spaced equalization, two or more sample phases are kept (M sample phases are kept). The an of synchronization is well known. Typically, the synchronizer correlates the received data samples to one or more known synchronization sequences. Sometimes only a portion, or sub-sequence, of the known synchronization sequence is used. The correlation values are typically combined in some way and then compared with one another, to determine the position of the synchronization and the best sampling phase or phases. This sampling information is provided to a decimator 203 which, for every sampling phase selected, keeps only one sample of the data every T seconds. The synchronizer also supplies synchronization information, such as frame timing information and channel tap information. The channel tap information can be related directly to the correlation values computed during synchronization.

Figure 5:
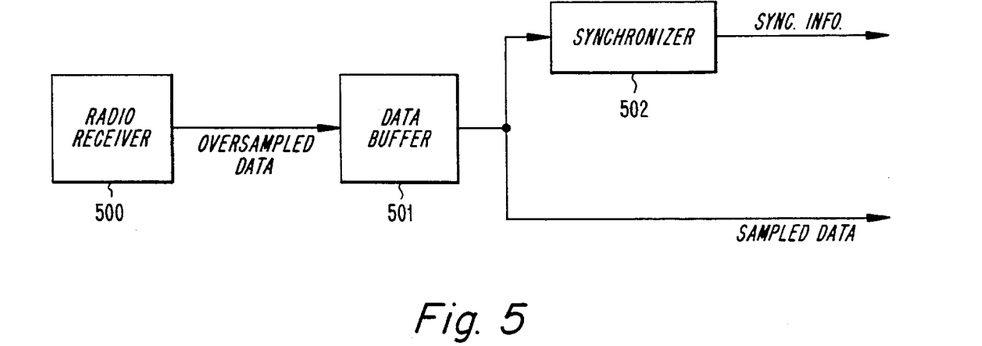
FIG. 5 illustrates a branch signal processor according to one embodiment of the present invention.

An alternative embodiment of the diversity branch signal processor is shown in FIG. 5. The radio receiver 500 converts the radio signal into a sampled complex baseband received signal which can be stored in a buffer 501 as described above with respect to FIG. 2. Unlike the embodiment shown in FIG. 2, the radio receiver 500 does not oversample the received data. Instead, the radio receiver provides MT samples of data per symbol period T. Thus, there is no need for decimation of the complex data stream. However, the synchronizer 502 only provides synchronization information.

Figure 3:
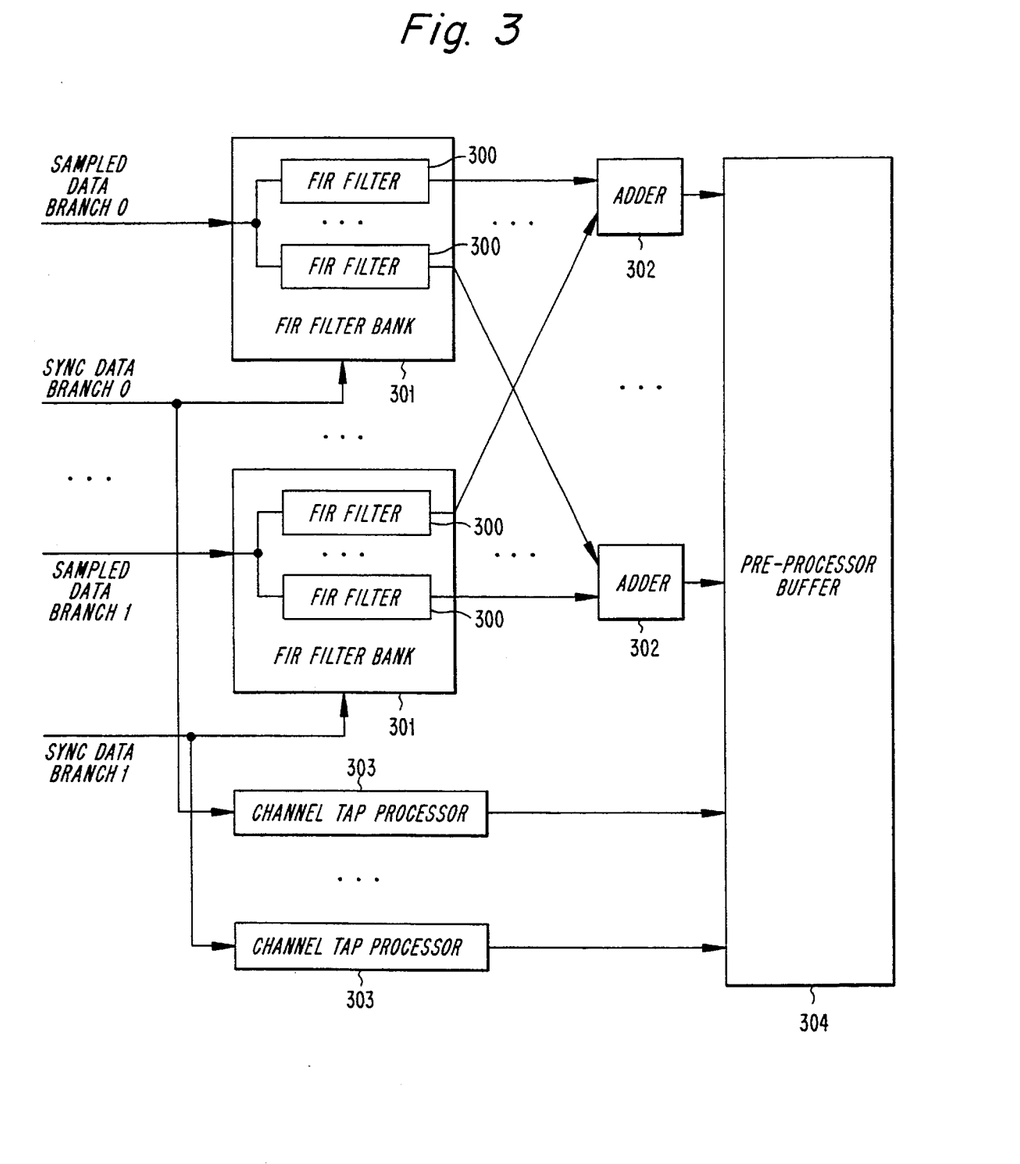
FIG. 3 illustrates a metric pre-processor according to one embodiment of the present invention.

The metric pre-processor is described in more detail in FIG. 3. This preprocessor is used to compute the metric multipliers e(j), g(j,k) and f(j) if needed. For each diversity branch, there is a FIR filter bank 301 consisting of a plurality of FIR filters 300. There are J FIR filters 300 in each filter bank 301, i.e., one FIR filter per ray in the channel models. The outputs of these FIR filters are summed such that the first FIR filter outputs are summed, the second FIR filter outputs are summed, and so forth. These summations are performed by adders 302. This gives J metric multipliers for term $B'_h(n)$.

The metric pre-processor also computes the metric multipliers for $C'_h(n)$, and $D'_h(n)$. Each of these terms consists of a sum of channel tap products. These can be computed by using the channel tap processor 303, and they need only be computed once if the channel is static. All pre-processor results are then stored in a buffer 304.

Figure 4:
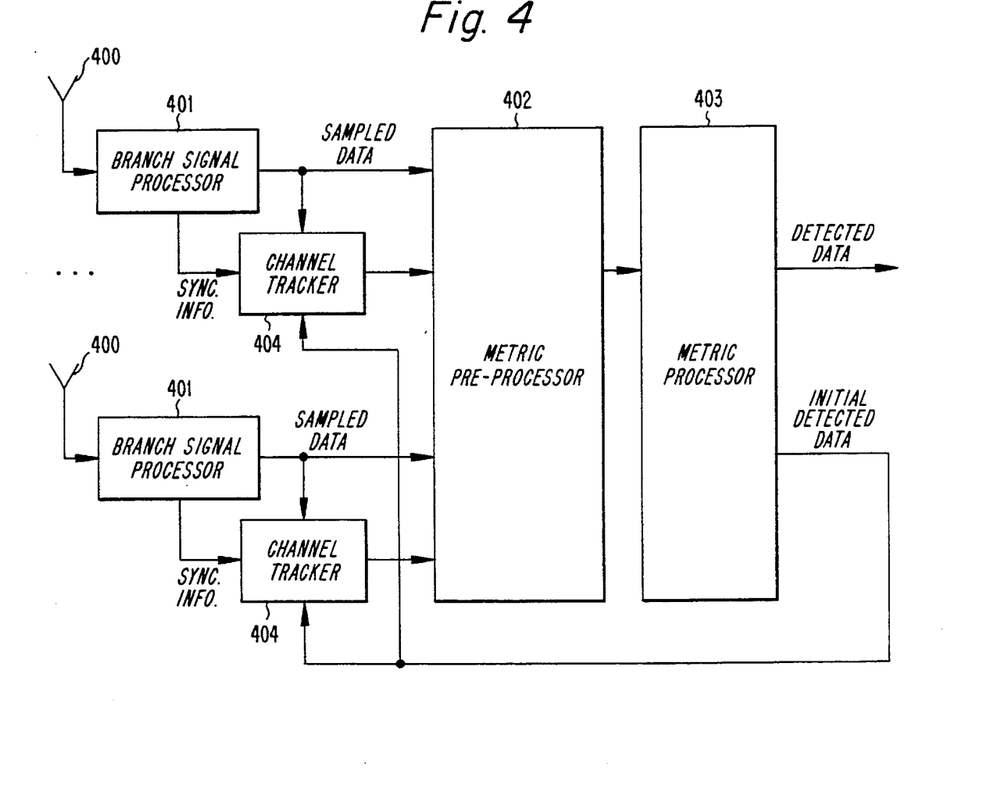
FIG. 4 illustrates a digital communication receiver according to one embodiment of the present invention.

The embodiment illustrated in FIG. 1 is applicable for the case where the channel does not change appreciably for the data associated with a particular synchronization field. However, when this is not the case, the channel taps must be adaptively estimated or predicted on each diversity branch. A receiver for use in this situation is illustrated in FIG. 4, in which like elements correspond to like elements in FIG. 1. In this embodiment, initial channel tap estimates can be obtained from the synchronization process and these estimates may be further refined by training a channel tracker over the synchronization field. Finally, tentative symbol detections may be fed back to the diversity branch channel trackers to allow refinement of the channel estimates or predictions.

In FIG. 4, each diversity branch has an associated channel tracker 404. This tracker estimates or predicts the channel taps that correspond to the sampled data provided to the metric pre-processor 402. The tracker can be initialized using synchronization information provided by the diversity branch signal processor 401. A method for both initialization and tracking is given in pending U.S. application Ser. No. 07/942,270 entitled "A Method of Forming a Channel Estimate for a Time-varying Radio Channel" by Larsson et al., filed Sep. 9, 1992, which is incorporated herein by reference. The channel tracker may have two modes: a training mode and a decision-directed mode. During the training mode, the channel tracker uses knowledge of what was transmitted to train the channel tap estimates. This knowledge can correspond to the synchronization sequence or other known sequences within the transmitted symbol stream. During the decision-directed mode, the channel tracker takes tentatively detected data from the metric processor 403 and assumes that they are correct. This allows the channel tracker to update channel tap estimates. Those skilled in the art will be aware that there are many forms of channel tracking and prediction.

The metric pre-processor 402 computes the necessary metric multipliers from the sampled data and channel tap estimates or predictions. The metric processor 403 uses the metric multipliers with the sequence estimation algorithm to provide both tentative and final detected data. The tentative data are used for channel tracking purposes. At time n, the tentative data correspond to decisions on transmitted symbols s(n−upd) through s(n−upd−J+1), where upd is an update delay design parameter, which is some non-negative integer. Knowledge of these symbol values allows the channel trackers to predict certain received data values and to compare the predictions with the actual values. The difference can be used to update the channel tap estimates, which are used to predict channel values for time n+1.

According to one preferred embodiment of the present invention, the present invention is used in a receiver for IS54 TDMA digital cellular signals. Two-branch antenna diversity would be used (D=2) and T/2-spaced equalization (M=2). The number of channel taps (J) would be 2. While the modulation is $\pi/4$-shift DQPSK, the $\pi/4$-shift can be removed from the received data. For data sample (n+m/M)T, this is achieved by a multiplication with $\exp(-\pi-(n+m/M)4)$. The resulting data can be treated as a QPSK symbol stream.

The embodiment shown in FIG. 4 would be used to demodulate the received signal. At iteration n, the metric multipliers are given by:

$$e(0,n)=w_{0,0}(n)c_0^*{}_{,0}(0,n)r_0(nT)+ w_{0,1}(n)c_0^*{}_{,1}(0,n)r_0((n+\tfrac{1}{2})T)+w_{1,0}(n)c_1^*{}_{,0}(0,n)r_1(nT)+ w_{1,1}(n)c_1^*{}_{,1}(0,n)r_1((n+\tfrac{1}{2})T)$$

$$e(1,n)=w_{0,0}(n)c_0^*{}_{,0}(1,n)r_0(nT)+ w_{0,1}(n)c_0^*{}_{,1}(1,n)r_0((n+\tfrac{1}{2})T)+w_{1,0}(n)c_1^*{}_{,0}(1,n)r_1(nT)+ w_{1,1}(n)c_1^*{}_{,1}(1,n)r_1((n+\tfrac{1}{2})T)$$

$$g(0,1,n)=w_{0,0}(n)c_0^*{}_{,0}(0,n)c_{0,0}(1,n)+ w_{0,1}(n)c_1^*{}_{,1}(0,n)c_{0,1}(1,n)+w_{1,0}(n)c_1^*{}_{,0}(0,n)c_{1,0}(1,n)+ w_{1,1}(n)c_1^*{}_{,1}(0,n)c_{1,1}(1,n)$$

The f(j,n) terms are omitted since $|s_h(n)|^2=1$ for all h. When forming the metric, the term $C'_h$ would also be omitted.

Figure 6:
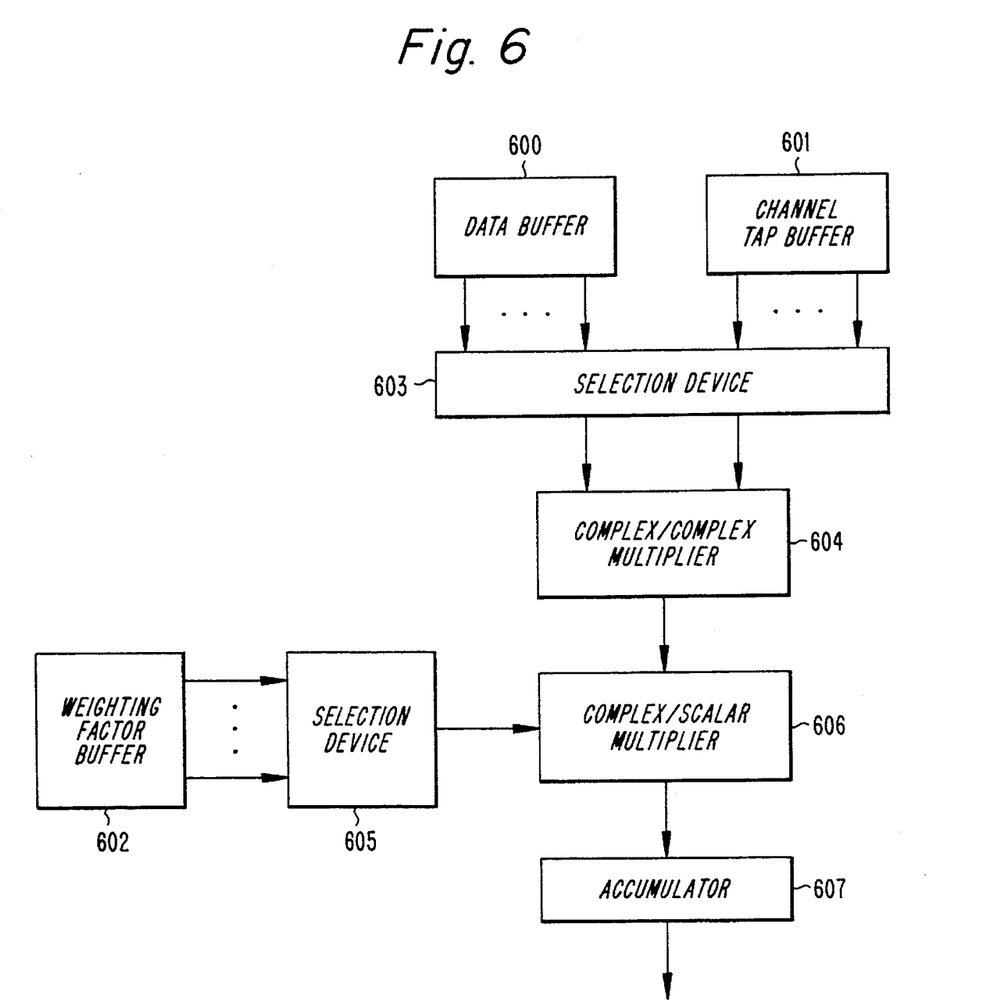
FIG. 6 illustrates a metric pre-processor according to one embodiment of the present invention.

An embodiment of the metric pre-processor is given in FIG. 6. Received data values are stored in a data buffer 600, channel tap estimates are stored in a channel tap buffer 601, and weighting factors are stored in a weighting factor buffer 602. At time n, the metric multipliers are computed one at a time. A selection device 603 selects two complex values, either a data value and a channel tap value or two channel tap values. These selected values are multiplied in a complex/complex multiplier 604, which multiplies one of the values with the conjugate of the other value to form a first product. A selection device 605 selects one scalar weighting factor, which is multiplied by the first product in a complex/scalar multiplier 606, which multiplies complex and scalar values to produce a second product. This second product is accumulated in an accumulator 607. This process is repeated four times to produce a particular metric multiplier. Then, the accumulator contents are reset and the process is repeated until all three metric multipliers are produced.

In the metric processor, at time n, there are four previous states corresponding to hypothetical (n−1)the symbols and four current states corresponding to hypothetical n'th symbol values. This gives 16 possible hypotheses to consider. The delta metric associated with a given hypothesis h is given by:

$$M_h(n)=Re\{e(0,n)s_h^*(n)+e(1,n)s_h^*(n-1)\}-Re\{g(0,1,n)s_h^*(n)s_h(n-1)\}$$

The metric multipliers are not explicitly multiplied with hypothetical symbol values, since these hypothetical values for $s_h^*(n)$, $s_h^*(n-1)$, and $s_h^*(n)s_h(n-1)$ are all +1, −1, +i, and −i, where i denotes the unity imaginary number. Thus, multiplication of a+ib by these values is equivalent to forming a+ib, −a−ib, −b+ia, and b−ia, respectively. Thus, the 16 branch metrics can be formed by a set of adders and invertors, which add and negate the real and imaginary parts of the metric premultipliers It will be known to those skilled in the art that other sequence estimation algorithms, besides the Viterbi algorithm, can be used to exploit the metrics in finding a detection decision. For example, sequential decoding and other nonexhaustive search methods can be used. It will be known to those skilled in the art that the above invention can be applied to other forms of diversity, such as frequency diversity, time diversity, and polarization diversity. Finally, the above invention can be used to efficiently implement a combination of MLSE and decision-feedback equalization, as described in M.V. Eyuboglu and S.U.H. Qureshi, "Reduced-state sequence estimation and set partitioning and decision feedback", IEEE *Trans. Commun.*, Vol. 36, pp. 13–20, Jan. 1988.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

I claim:

1. A digital communications receiver, comprising:

means for signal processing a plurality of diversity branches to produce complex receive data samples and synchronization information from received signals;

means for forming channel tap estimates from said data samples and said synchronization information;

means for forming weighting factors using said data samples, said channel tap estimates, and said synchronization information;

means for pre-processing said data samples, said channel tap estimates, and said weighting factors to produce metric multipliers; and means for combining said metric multipliers with hypothesized data sequences to generate and accumulate metrics using a sequence estimation algorithm, producing a alemodulated data stream.

2. A receiver according to claim 1, wherein the signal processing means comprises:

means for processing radio signals to produce complex data samples; and means for synchronizing said receiver using said complex data samples to produce timing information and initial channel tap estimates.

3. A receiver according to claim 2, wherein the signal processing means further comprises:

means for storing said complex data samples.

4. A receiver according to claim 1, wherein the signal processing means comprises:

means for processing radio signals to produce complex data samples;

means for synchronizing said receiver using said complex data samples to produce timing information and channel model information; and means for decimating said complex data samples using sampling phases determined by said synchronizing.

5. A receiver according to claim 1, wherein the pre-processing means comprises:

means for filtering each branch data sample stream using a bank of finite impulse response (FIR) filters and filter coefficients based on said channel tap estimates; and means for computing products and their sums using said channel tap estimates.

6. A digital communications receiver comprising:

means for signal processing a plurality of diversity branches to produce complex receive data samples and synchronization information from received signals;

means for forming time varying channel tap estimates from said data samples, said synchronization information, and tentative data detections produced by a combining means;

means for foraging time-varying weighting factors using said data samples, said channel tap estimates, said synchronization information, and said tentative data detections;

means for pre-processing said data samples, said channel tap estimates, and said weighting factors to produce metric multipliers; and said combining means for combining said metric multipliers with hypothesized data sequences to generate and accumulate metrics using a sequence estimation algorithm, producing a demodulated data stream.

7. A receiver according to claim 6, wherein the signal processing means comprises:

means for processing radio signals to produce complex data samples; and means for synchronizing said receiver using said complex data samples to produce timing information and initial channel model information.

8. A receiver according to claim 7, wherein the signal processing means further comprises:

means for storing said complex dam samples.

9. A receiver according to claim 6, wherein the signal processing means comprises:

means for processing radio signals to produce complex data samples;

means for synchronizing said receiver using said complex data samples to produce timing information and initial channel model information; and means for decimating said complex data samples using sampling phases determined by said synchronizing.

10. A receiver according to claim 6, wherein the pre-processing means comprises:

means for filtering each branch data sample stream using a bank of finite impulse response (FIR) filters and filter coefficients based on said channel estimates; and means for computing products and their sums using said channel estimates.

11. A method for joint equalization and diversity combining in a digital communications receiver, comprising the steps of:

signal processing a plurality of diversity branches to produce complex receive data samples and synchronization information from received signals;

forming channel tap estimates from said data samples and said synchronization information;

forming weighting factors using said data samples, said channel tap estimates, and said synchronization information;

pre-processing said data samples, said channel tap estimates, and said weighting factors to produce metric multipliers; and combining said metric multipliers with hypothesized data sequences to generate and accumulate metrics using a sequence estimation algorithm, producing a demodulated data stream.

12. A method for joint equalization and diversity combining in a digital communications receiver, comprising the steps of:

signal processing a plurality of diversity branches to produce complex receive data samples and synchronization information from received signals;

forming time-varying channel tap estimates from said data samples, said synchronization information, and tentative data detections produced by a processor;

forming time-varying weighting factors using said data samples, said channel tap estimates, said synchronization information and said tentative data detections;

pre-processing said data samples, said channel tap estimates, and said weighting factors to produce metric multipliers; and combining said metric multipliers with hypothesized data sequences to generate and accumulate metrics using a sequence estimation algorithm, producing a demodulated data stream.

13. In an IS54-based Time Division Multiple Access digital communications system, a receiver comprising:

means for signal processing a plurality of diversity branches to produce complex receive data samples and synchronization information from received signals;

means for forming time-varying channel tap estimates from said data samples, said synchronization information, and tentative data detections produced by a combining means;

means for forming time-varying weighting factors using said data samples, said channel tap estimates, said synchronization information, and said tentative data detections;

means for pre-processing said data samples, said channel tap estimates, and said weighting factors to produce metric multipliers; and said combining means for combining said metric multipliers with hypothesized data sequences to generate and accumulate metrics using a sequence estimation algorithm, producing a demodulated data stream.

14. In an IS54-based Time Division Multiple Access digital communications system, a method for joint equalization and diversity combining in a digital communications receiver, comprising the steps of:

signal processing a plurality of diversity branches to produce complex receive data samples and synchronization information from received signals;

forming time-varying channel tap estimates from said data samples, said synchronization information, and tentative data detections produced by a processor;

forming time-varying weighting factors using said data samples, said channel tap estimates, said synchronization information, and said tentative data detections;

pre-processing said data samples, said channel tap estimates, and said weighting factors to produce metric multipliers; and combining said metric multipliers with hypothesized data sequences to generate and accumulate metrics using a sequence estimation algorithm, producing a demodulated data stream.

* * * * *

UNITED STATES PATENT AND TRADEMARK OFFICE
CERTIFICATE OF CORRECTION

PATENT NO. : 5,499,272

DATED : March 12, 1996

INVENTOR(S) : Gregory E. Bottomley

It is certified that error appears in the above-indentified patent and that said Letters Patent is hereby corrected as shown below:

Column 1, line 29, change "ease" to --case--;
          line 46, change "McGrawHill" to --McGraw-Hill--;
          line 58, change "dam" to --data--;

Column 2, line 14, change "IEEE" to read --*IEEE*--;
          line 17, change "*Ind.*" to read --*Intl.*--;
          line 20, change "43rd" to read --*43rd*--;
          line 21, change "IEEE" to read --*IEEE*--;
          line 39, change "IEEE" to read --*IEEE*--;

Column 3, line 60, change "c'(n)" to read --C'(n)--;

Column 4, line 25, change "IEEE" to read --*IEEE*--;
          line 33, change "benefitted" to --benefited--;

Column 6, line 7, change "$S_h(j)$" to read --$S_h(n-j)$--;
          line 39, change "1/Nd(n)" to read --$1/N_d(n)$--;
          line 57, change "$k \neq j$" to read --$k > j$--;

Column 9, line 19, change "corresponds" to --correspond--;
          line 63, change "an" to --art--;

Column 10, line 18, change "MT" to --M--;

UNITED STATES PATENT AND TRADEMARK OFFICE
CERTIFICATE OF CORRECTION

PATENT NO. : 5,499,272

DATED : March 12, 1996

INVENTOR(S) : Gregory E. Bottomley

It is certified that error appears in the above-indentified patent and that said Letters Patent is hereby corrected as shown below:

Column 11, line 29, change "-$\pi$-" to read -- $\pi$ --;
            line 30, change "M)4)" to read --M)/4)--;
            line 63, change "the" to read --th--;

Column 12, line 10, change "invertors" to --inverters--;
            line 24, change "IEEE" to read --*IEEE*--;
            line 51, change "alemodulated" to --demodulated--; and Column 13, line 18, change "foraging" to --forming--;
            line 38, change "dam" to --data--.

Signed and Sealed this

Twenty-sixth Day of November 1996

Attest:

BRUCE LEHMAN

Attesting Officer      Commissioner of Patents and Trademarks